United States Patent
Lin et al.

(10) Patent No.: US 12,366,898 B1
(45) Date of Patent: *Jul. 22, 2025

(54) ROTATING SHAFT DEVICE

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,940

(22) Filed: Apr. 11, 2024

(30) Foreign Application Priority Data

Jan. 12, 2024 (TW) ................................. 113101410

(51) Int. Cl.
*G06F 1/16* (2006.01)

(52) U.S. Cl.
CPC ............ *G06F 1/1681* (2013.01); *G06F 1/166* (2013.01); *G06F 1/1667* (2013.01)

(58) Field of Classification Search
CPC ....... G06F 1/1681; G06F 1/166; G06F 1/1667
See application file for complete search history.

(56) References Cited

U.S. PATENT DOCUMENTS

| | | | | | |
|---|---|---|---|---|---|
| 5,239,444 | A | * | 8/1993 | Sasaki ................... | G06F 1/1684 361/679.44 |
| 6,097,595 | A | * | 8/2000 | Cipolla ................... | G06F 1/166 248/688 |
| 7,990,692 | B2 | * | 8/2011 | Wang ..................... | G06F 1/1616 16/326 |
| 8,050,031 | B2 | * | 11/2011 | Wang ..................... | G06F 1/1681 361/679.55 |
| 8,792,237 | B2 | * | 7/2014 | Guo ....................... | G06F 1/1681 361/679.55 |
| 8,879,251 | B2 | * | 11/2014 | Hsiu ....................... | H05K 5/03 361/679.59 |
| 9,047,058 | B2 | * | 6/2015 | Yu .......................... | G06F 1/1679 |
| 9,696,764 | B2 | * | 7/2017 | Wolff ..................... | G06F 1/1681 |
| 10,241,540 | B2 | * | 3/2019 | Chuang .................. | G06F 1/203 |
| 10,503,214 | B2 | * | 12/2019 | Jiang ...................... | G06F 1/166 |
| 10,534,408 | B2 | * | 1/2020 | Cheng .................... | G06F 1/1616 |

(Continued)

FOREIGN PATENT DOCUMENTS

CN 107368148 B * 4/2020 ............. G06F 1/162

*Primary Examiner* — Jeffrey O'Brien (74) *Attorney, Agent, or Firm* — Birch, Stewart, Kolasch & Birch, LLP (57) ABSTRACT

A rotating shaft device includes a base, a rotation member, a slide member, a supporting member, and a linkage unit. The rotation member is rotatable relative to the base between a first position and a second position. The slide member is slidable relative to the base. The supporting member is pivotable relative to the base between an initial position and a supporting position. The linkage unit is convertible between a folded state and an expanded state. When the rotation member is in the first position, the linkage unit is in the folded state and the supporting member is in the initial position. When the rotation member is rotated to the second position, the slide member is urged by the rotation member to slide and to convert the linkage unit into the expanded state, and the supporting member is urged by the linkage unit to pivot to the supporting position.

8 Claims, 8 Drawing Sheets

(56) References Cited

U.S. PATENT DOCUMENTS

| | | | | |
|---|---|---|---|---|
| 10,582,638 B2* | 3/2020 | Ye | | G06F 1/1681 |
| 10,642,309 B2* | 5/2020 | Cheng | | G06F 1/203 |
| 11,073,879 B2* | 7/2021 | Wang | | G06F 1/206 |
| 11,169,575 B2* | 11/2021 | Elsey | | G06F 1/1681 |
| 11,435,235 B2* | 9/2022 | McKittrick | | G05B 15/02 |
| 11,644,872 B2* | 5/2023 | Lin | | G06F 1/1692 |
| | | | | 345/173 |
| 11,714,462 B2* | 8/2023 | Shin | | G06F 1/1681 |
| | | | | 361/679.27 |
| 11,775,027 B2* | 10/2023 | Onda | | G06F 1/1679 |
| | | | | 361/679.12 |
| 11,797,060 B2* | 10/2023 | Zhong | | G06F 1/203 |
| 12,147,277 B2* | 11/2024 | Wu | | G06F 1/1662 |
| 12,204,380 B2* | 1/2025 | Park | | G06F 1/1618 |
| 2011/0292605 A1* | 12/2011 | Chen | | G06F 1/1681 |
| | | | | 16/303 |
| 2020/0341515 A1* | 10/2020 | Moser | | G06F 1/1692 |
| 2021/0089077 A1* | 3/2021 | Wang | | G06F 1/3287 |
| 2022/0397933 A1* | 12/2022 | Cha | | G06F 1/1681 |
| 2023/0376082 A1* | 11/2023 | Yamamoto | | G06F 1/1679 |
| 2024/0103570 A1* | 3/2024 | Huang | | H05K 5/0226 |
| 2024/0152187 A1* | 5/2024 | Wen | | G06F 1/203 |
| 2024/0385654 A1* | 11/2024 | Ku | | G06F 1/1677 |

* cited by examiner

ROTATING SHAFT DEVICE

CROSS-REFERENCE TO RELATED APPLICATION

This application claims priority to Taiwanese Invention Patent Application No. 113101410, filed on Jan. 12, 2024, the entire disclosure of which is incorporated by reference herein.

FIELD

The disclosure relates to a rotating shaft device, and more particularly to a rotating shaft device that may be used in an electronic device, such as a notebook computer.

BACKGROUND

When a user uses an electronic device such as a notebook computer, the user may need to use a heat dissipation rack to lift a rear side of the notebook computer so that a space for dissipating heat generated during operation of the notebook computer may be increased, and that the user may experience greater comfort when using a keyboard of the notebook computer. However, the heat dissipation rack is not easy to use or to store. How to conveniently lift the rear side of the notebook computer when the user uses the notebook computer becomes a problem to be resolved.

SUMMARY

Therefore, an object of the disclosure is to provide a rotating shaft device that can alleviate the drawback of the prior art.

According to the disclosure, the rotating shaft device includes a base, a rotation member, a slide member, a supporting member, and a linkage unit. The rotation member is disposed on the base, and is rotatable relative to the base about a rotation axis between a first position and a second position. The rotation axis extends in a left-right direction. The rotation member has a rotation guiding structure that at least partially surrounds the rotation axis. The slide member is disposed on the base, and is slidable relative to the base in the left-right direction. The slide member has a slide engaging structure that is coupled to the rotation guiding structure and that is slidable along the rotation guiding structure, and a slide guiding structure that extends in an up-down direction. The supporting member is pivotably mounted to the base, and is pivotable relative to the base between an initial position and a supporting position. The linkage unit includes a first link that is pivotally connected to the base, a second link that is located at one side of the first link, and that is pivotably connected to the first link and the supporting member, and a linkage engaging structure that is disposed at a junction of the first link and the second link, that is coupled to the slide guiding structure of the slide member, and that is slidable along the slide guiding structure. A portion of the second link peeks out from under the first link. The linkage unit is convertible between a folded state and an expanded state. When the rotation member is in the first position, the linkage unit is in the folded state and the supporting member is in the initial position. When the rotation member is rotated to the second position, the slide member is urged by rotation of the rotation member to slide in the left-right direction and to convert the linkage unit into the expanded state, and the supporting member is urged by the second link of the linkage unit to pivot to the supporting position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features May be oriented differently (e.g., rotated 90 degrees or at other orientations) and the spatially relative terms used herein may be interpreted accordingly.

Figure 1:
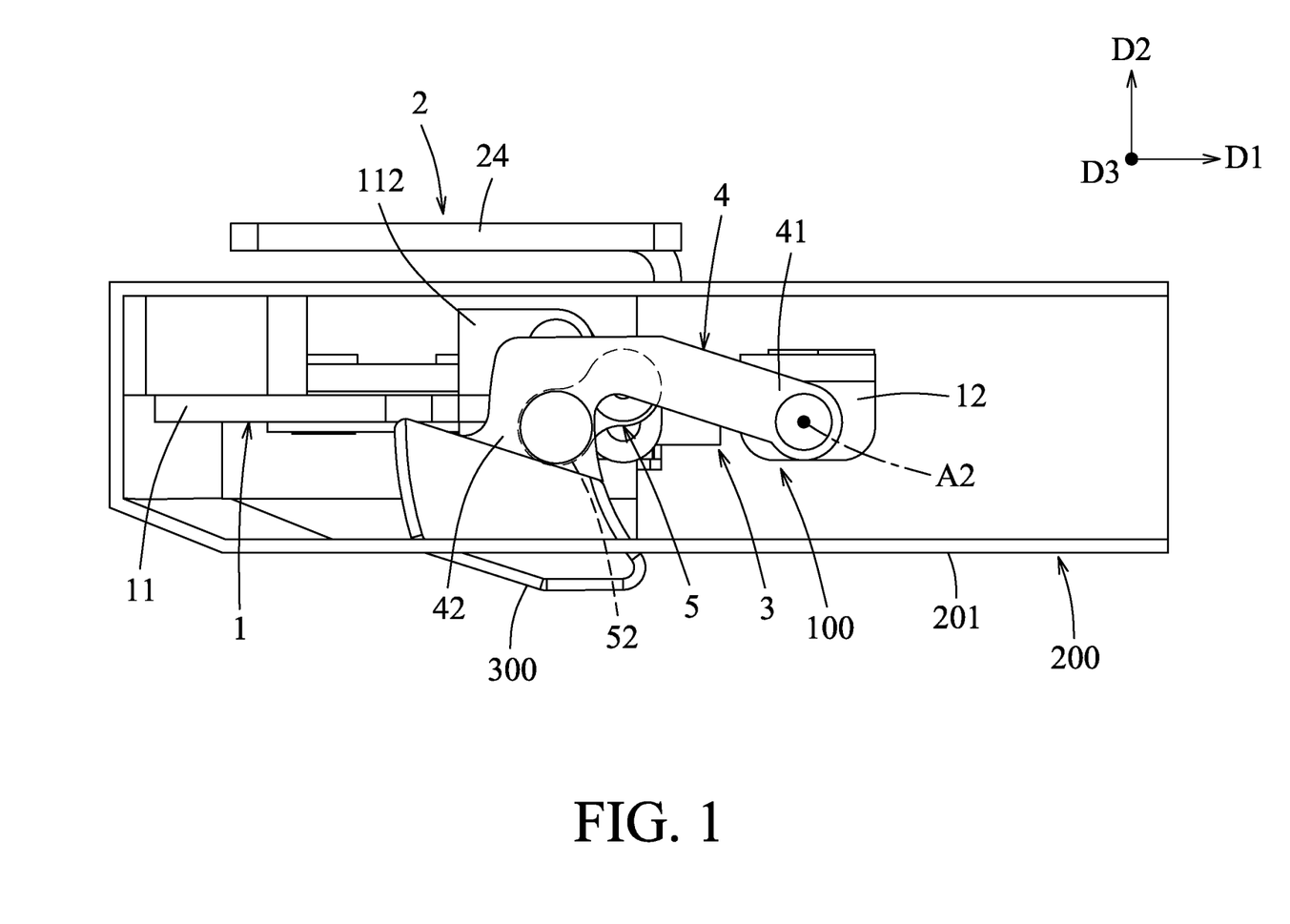
FIG. 1 is a schematic front view illustrating an embodiment of a rotating shaft device according to the disclosure mounted to an electronic device while a rotation member of the embodiment is in a first position and a supporting member of the embodiment is in an initial position.
Figure 2:
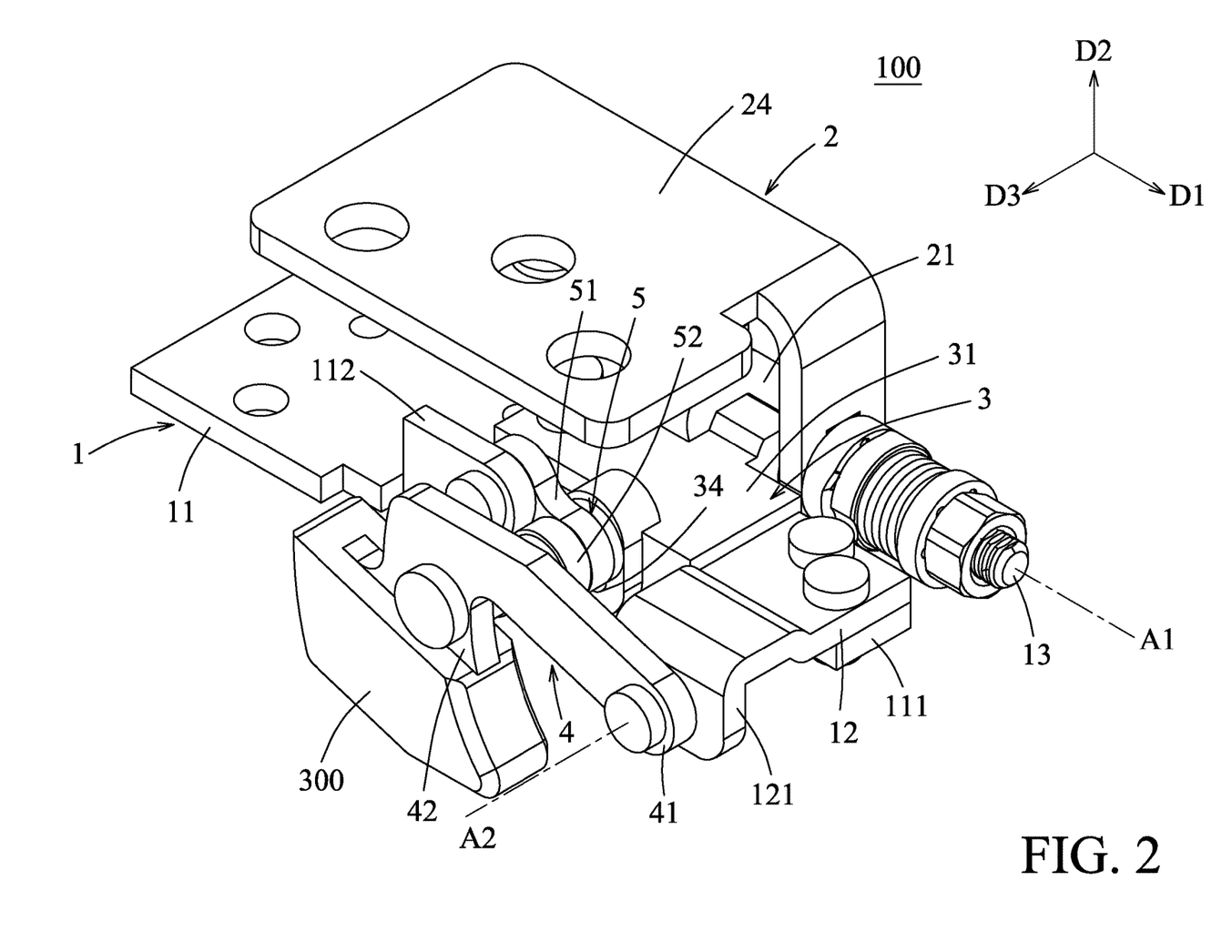
FIG. 2 is a perspective view of the embodiment illustrating the rotation member being in the first position and the supporting member being in the initial position.
Figure 3:
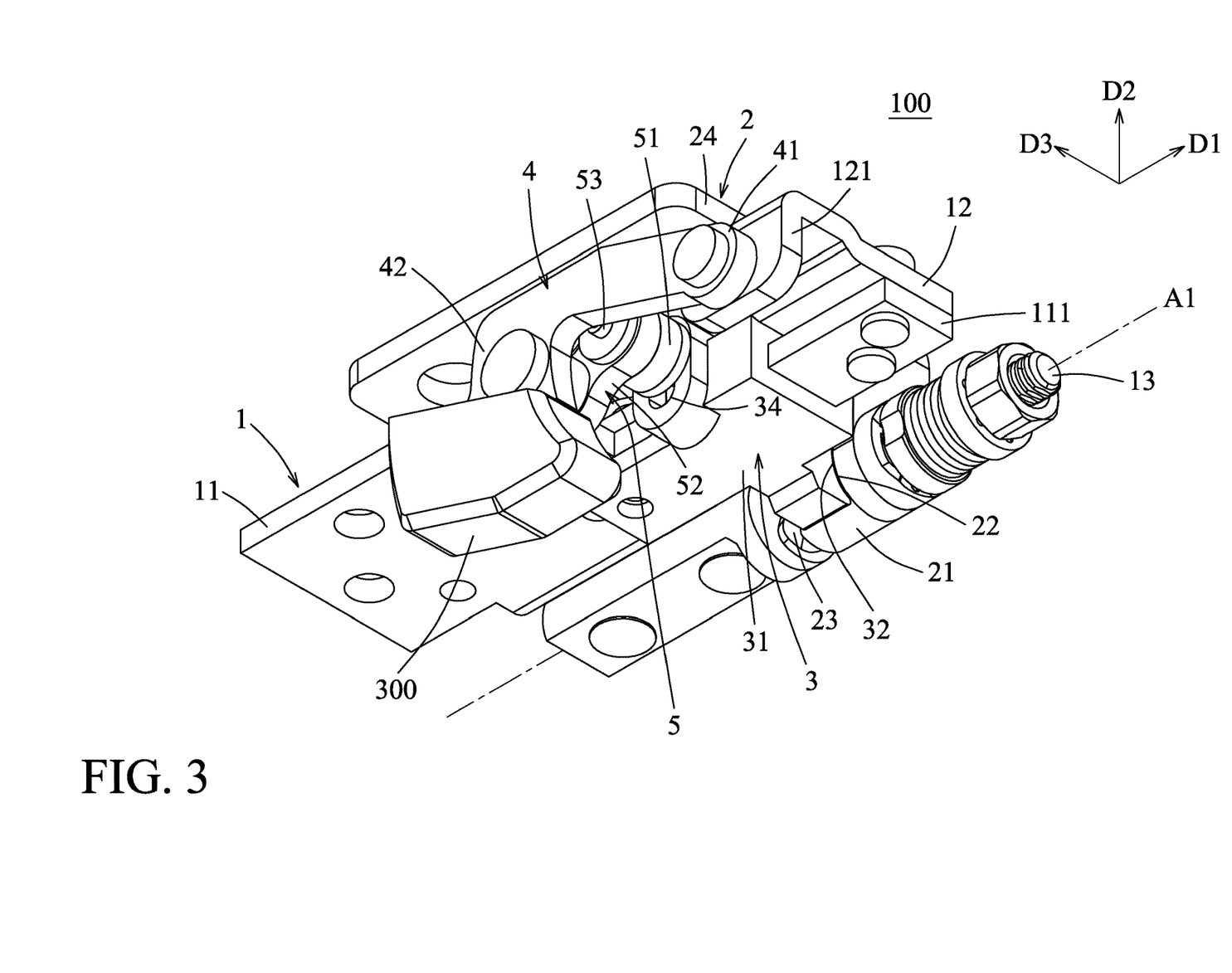
FIG. 3 is a perspective view of the embodiment viewed from another viewing angle.

Referring to FIGS. 1 to 3, an embodiment of a rotating shaft device 100 according to the disclosure is adapted to be used in an electronic device 200. The electronic device 200 may be, but not limited to be, a notebook computer. The electronic device 200 includes a first housing 201 and a second housing (not shown). The first housing 201 may be provided with, for example, a keyboard (not shown), a display (not shown), and a touchpad (not shown). The rotating shaft device 100 is adapted to interconnect the first housing 201 and the second housing so that the second housing can rotate relative to the first housing 201 (i.e., the electronic device 200 can be opened or closed). The rotating shaft device 100 includes a base 1, a rotation member 2, a slide member 3, a supporting member 4, and a linkage unit 5.

Figure 4:
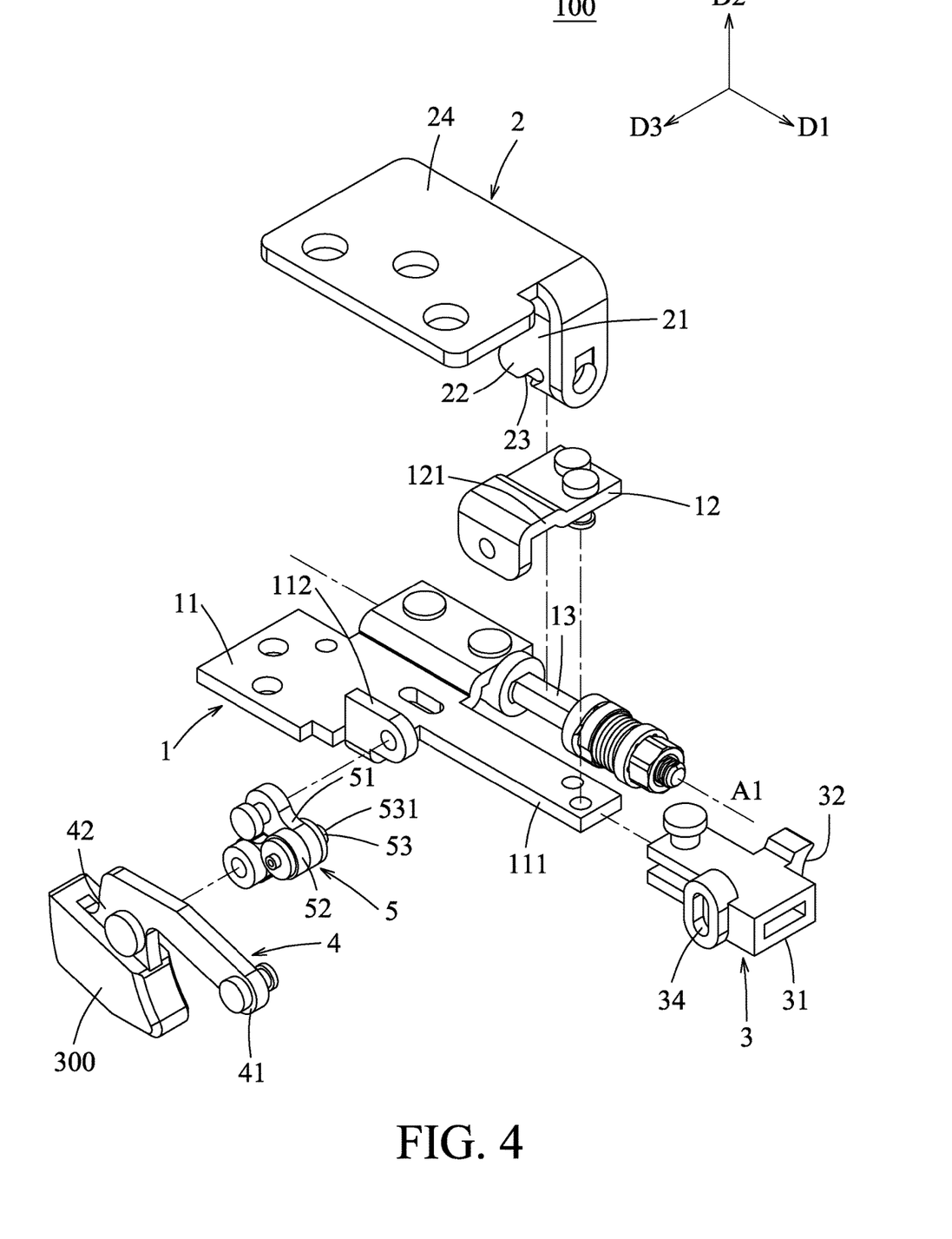
FIG. 4 is a partly exploded perspective view of the embodiment.

Referring to FIG. 4, in cooperation with FIGS. 1 to 3, the base 1 is adapted to be disposed on the first housing 201. The base 1 includes a first seat body 11, a second seat body 12, and a rotation rod 13. The first seat body 11 is adapted to be mounted to a rear side of the first housing 201. The second seat body 12 is mounted to the first seat body 11. The rotation rod 13 is mounted to a rear side of the first seat body 11, and extends along a rotation axis (A1) that extends in a left-right direction (D1). The first seat body 11 includes a guide rod 111 that extends in the left-right direction (D1), and a mounting plate 112 that extends in an up-down direction (D2), that extends upwardly from a front side thereof, and that has a surface facing forwardly in a front-rear direction (D3). The second seat body 12 is mounted to an end of the guide rod 111 of the first seat body 11, and has an extension structure 121 that extends forwardly from the guide rod 111. It is noted that, in FIGS. 1 to 8, an arrow that represents the left-right direction (D1) points to a right side of the rotating shaft device 100, an arrow that represents the up-down direction (D2) points to an top side of the rotating shaft device 100, and an arrow that represents a front-rear direction (D3) points to a front side of the rotating shaft device 100.

Figure 5:
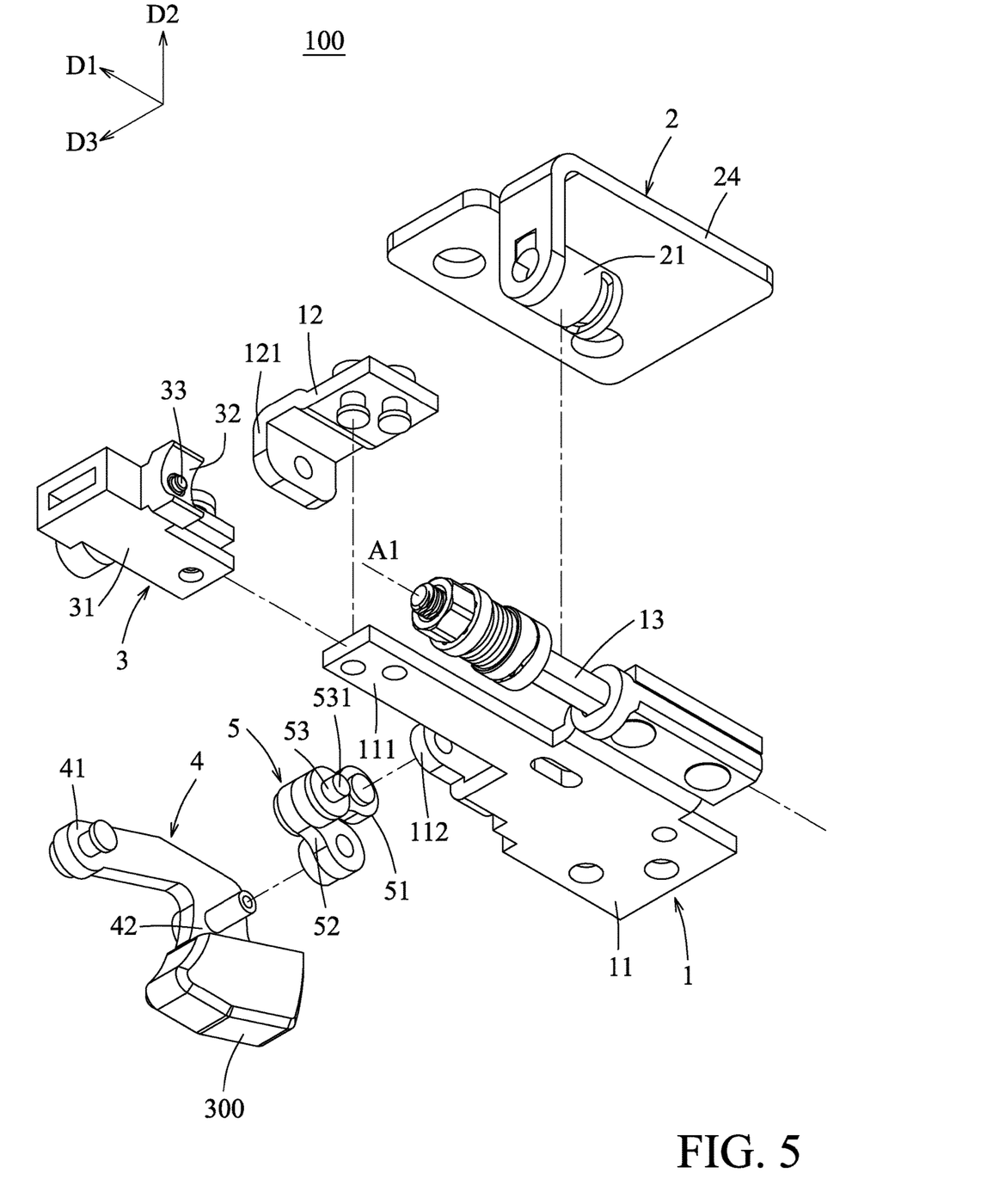
FIG. 5 is a partly exploded perspective view of the embodiment viewed from another viewing angle.

Referring to FIG. 5, in cooperation with FIGS. 2 to 4, the rotation member 2 is disposed on the rotation rod 13 of the base 1, and is adapted for the second housing to be disposed thereon. The rotation member 2 is rotatable relative to the base 1 about the rotation axis (A1) between a first position (see FIG. 2) and a second position (see FIG. 8). The rotation axis (A1) extends through the rotation rod 13 in the left-right direction (D1). The rotation member 2 has a rotary sleeve 21, a convex curved surface 22, a rotation guiding structure 23, and a mounting frame 24. The rotary sleeve 21 is rotatably sleeved on the rotation rod 13. The convex curved surface 22 is located on the rotary sleeve 21. The rotation guiding structure 23 is formed in the convex curved surface 22, is configured to be a groove, extends around the rotation axis (A1) in a direction that is oblique to the left-right direction (D1), and at least partially surrounds the rotation axis (A1). The mounting frame 24 extends from the rotary sleeve 21, and is adapted for the second housing to be mounted thereto.

Figure 6:
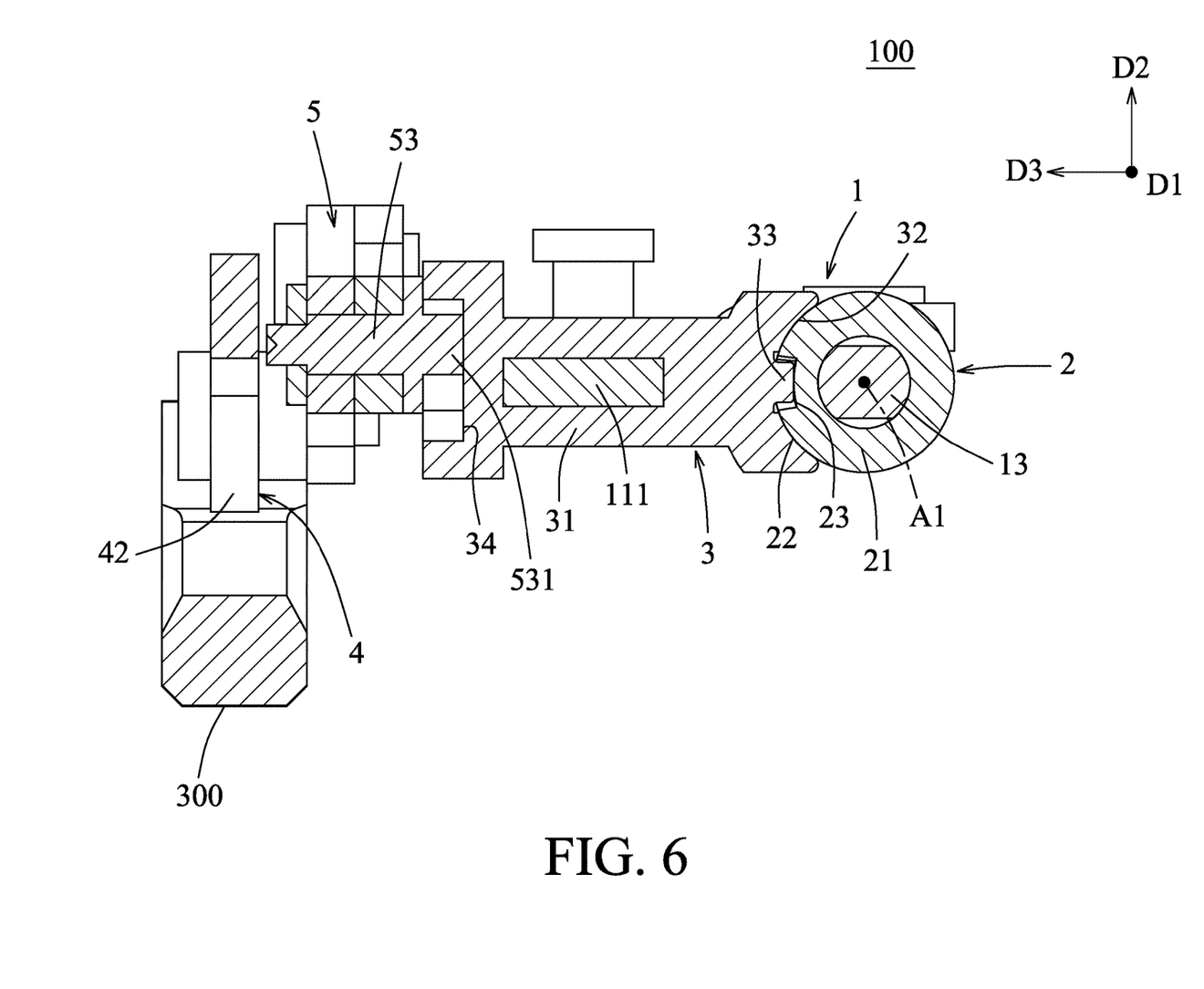
FIG. 6 is a sectional view of the embodiment.

Referring to FIG. 6, in cooperation with FIGS. 2, 4, and 5, the slide member 3 is disposed on the guide rod 111 of the base 1, and is slidable relative to the guide rod 111 in the left-right direction (D1). The slide member 3 has a slide sleeve 31, a concave curved surface 32, a slide engaging structure 33, and a slide guiding structure 34. The slide sleeve 31 is sleeved on the guide rod 111, and is slidable relative to the guide rod 111 in the left-right direction (D1). The concave curved surface 32 is located at a rear side of the slide sleeve 31, and is coupled to the convex curved surface 22. The slide engaging structure 33 is formed on the concave curved surface 32, is configured to be a protrusion, is coupled to the rotation guiding structure 23, and is slidable along the rotation guiding structure 23. The slide guiding structure 34 is formed in a front side of the slide sleeve 31, is configured to be a groove, and extends in the up-down direction (D2).

Referring to FIGS. 1, 2, 4 and 5 again, the supporting member 4 is configured to be rod-shaped, and is pivotably mounted to the extension structure 121 of the second seat body 12 of the base 1. The supporting member 4 is pivotable relative to the second seat body 12 of the base 1 about a pivot axis (A2) between an initial position (see FIG. 2) and a supporting position (see FIG. 8). The pivot axis (A2) extends in the front-rear direction (D3). The supporting member 4 has a pivot end portion 41 that is pivotably mounted to the extension structure 121 of the base 1, and a supporting end portion 42 that is opposite to the pivot end portion 41. When the supporting member 4 is urged to pivot about the pivot axis (A2) from the initial position to the supporting position, the supporting end portion 42 is urged to move downwardly relative to the base 1. A bottom section of the supporting end portion 42 is adapted for a foot pad 300 to be mounted thereto. The foot pad 300 that is mounted to the bottom section of the supporting end portion 42 is located at the rear side of the first housing 201, extends through the first housing 201, and protrudes downwardly from a bottom portion of the first housing 201.

Referring to FIGS. 2 and 4 to 6 again, the linkage unit 5 includes a first link 51, a second link 52, and an interconnecting member 53. The first link 51 is pivotably connected to the mounting plate 112 of the base 1. The second link 52 is located at a front side of the first link 51, and is pivotably connected to the first link 51 and the supporting end portion 42 of the supporting member 4. A portion of the second link 52 peeks out from under the first link 51. The interconnecting member 53 extends through a junction of the first link 51 and the second link 52 in the front-rear direction (D3), and interconnects the first link 51 and the second link 52. The interconnecting member 53 includes a linkage engaging structure 531. The linkage engaging structure 531 is disposed at the junction of the first link 51 and the second link 52, is configured to be a protrusion, is coupled to the slide guiding structure 34 of the slide member 3, and is slidable along the slide guiding structure 34. The linkage unit 5 is convertible between a folded state (see FIG. 2), in which the first link 51 and the second link 52 cooperatively define a first included angle on an imaginary plane that has a normal vector in the front-rear direction (D3), and an expanded state (see FIG. 8), in which the first link 51 and the second link 52 cooperatively define a second included angle on the imaginary plane. Each of the first and second included angles is located at one side of the linkage unit 5 that is opposite to the second seat body 12. The second included angle is greater than the first included angle. It is noted that, in this embodiment, the first included angle is smaller than 180 degrees.

Referring to FIGS. 1 to 3 again, when the rotation member 2 is in the first position, the electronic device 200 is closed (i.e., the first housing 201 and the second housing are arranged in the up-down direction (D2), and a bottom surface of the second housing is close to a top surface of the first housing 201), the linkage unit 5 is in the folded state (i.e., the first link 51 and the second link 52 cooperatively define the first included angle), and the supporting member 4 is in the initial position. The electronic device 200 may further include at least one additional foot pad (not shown) that is mounted to a front side of the first housing 201, and that protrudes downwardly from the bottom portion of the first housing 201. When the rotation member 2 is in the first position, the foot pad 300 that is mounted to the supporting end portion 42 and that is located at the rear side of the first housing 201 may protrude downwardly from the bottom portion of the first housing 201 to the same extent as the at least one additional foot pad that is mounted to the front side of the first housing 201 does.

Figure 7:
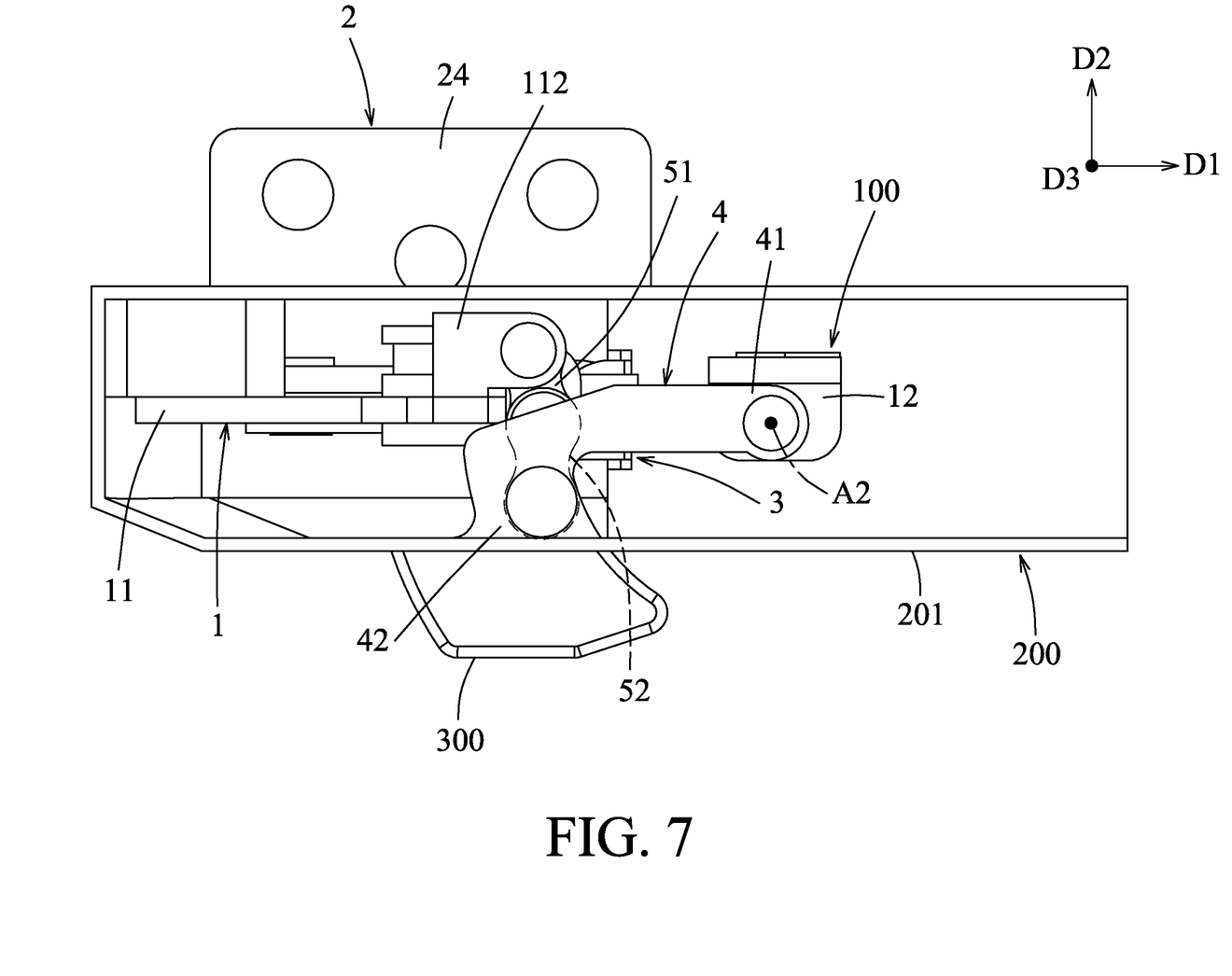
FIG. 7 is a view similar to FIG. 1, but illustrating the rotation member being in a second position and the supporting member being in a supporting position.
Figure 8:
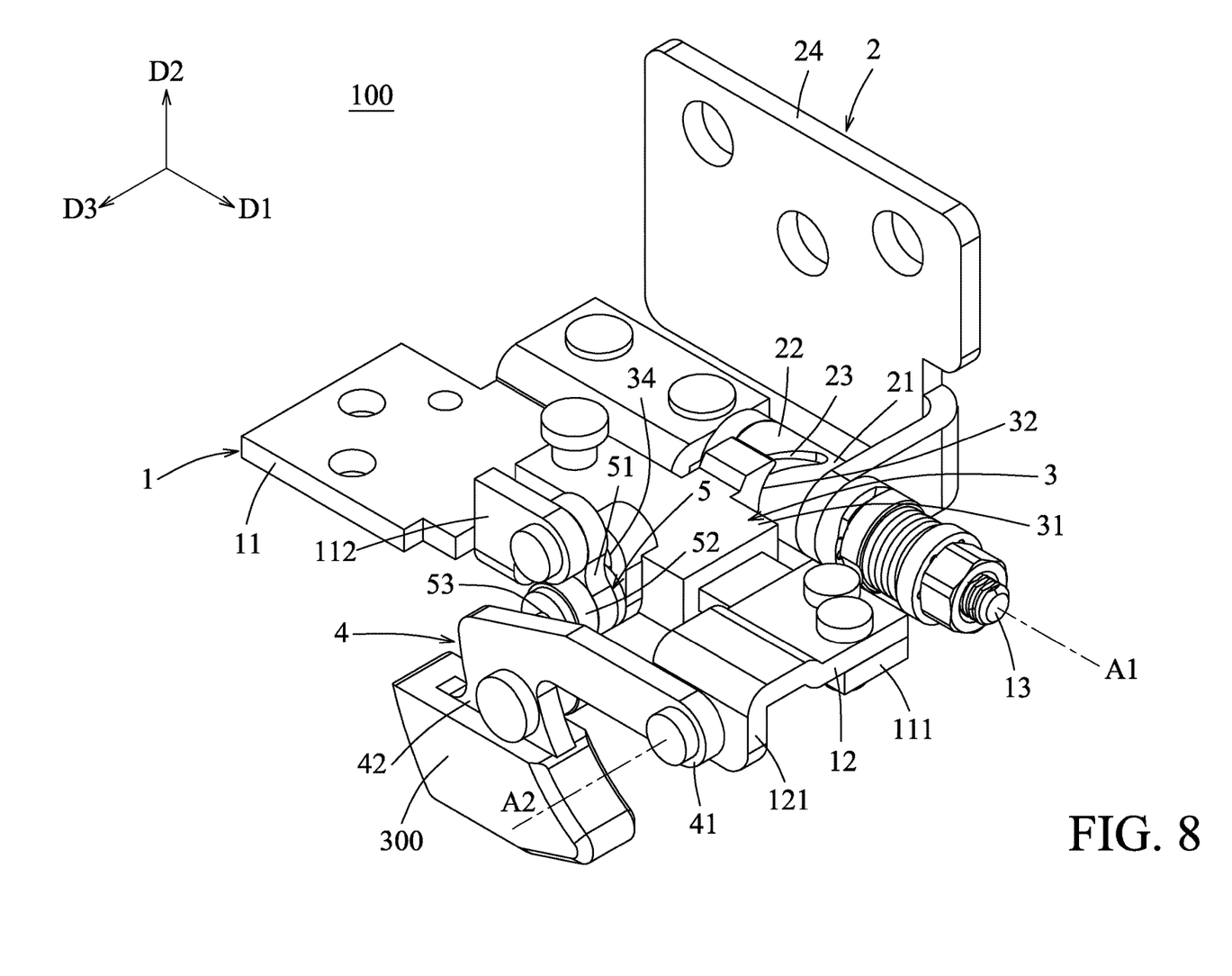
FIG. 8 is a perspective view of the embodiment illustrating the rotation member being in the second position and the supporting member being in the supporting position.

Referring to FIG. 7, in cooperation with FIG. 8, when the rotation member 2 is rotated to the second position, the electronic device 200 is opened (i.e., the second housing is rotated relative to the first housing 201 such that the bottom surface of the second housing is away from the top surface of the first housing 201), the slide member 3 is urged by rotation of the rotation member 2 to slide in the left-right direction (D1) and to convert the linkage unit 5 into the expanded state (i.e., the first link 51 and the second link 52 cooperatively define the second included angle that is greater than the first included angle), and the supporting member 4 is urged by the second link 52 of the linkage unit 5 to pivot to the supporting position (i.e., the supporting end portion 42 of the supporting member 4 is urged to move downwardly relative to the base 1). In this embodiment, when the rotation member 2 is rotated to the second position, the slide member 3 is urged by the rotation of the rotation member 2 to slide to the left. At this time, because the supporting end portion 42 is urged to move downwardly relative to the base 1 when the supporting member 4 is urged by the second link 52 to pivot to the supporting position, the foot pad 300 that is mounted to the supporting end portion 42 is urged to further protrude downwardly from the bottom portion of the first housing 201. Generally, when a user uses the electronic device 200, the foot pad 300 and the at least one additional foot pad abut against a plane that does not move. Consequently, when the supporting end portion 42 is urged to move downwardly relative to the base 1, and when the foot pad 300 that is mounted to the supporting end portion 42 is urged to further protrude downwardly from the bottom portion of the first housing 201, the rear side of the first housing 201 is lifted by a force that the foot pad 300 exerts on the plane (i.e., the rear side of the first housing 201 is located above the front side of the first housing 201), thereby increasing space for dissipating heat that is generated during operation of the electronic device 200 (i.e., the notebook computer), and offering greater comfort to the user when the user uses the keyboard of the first housing 201 of the electronic device 200.

Afterwards, when the rotation member 2 is rotated back to the first position, the electronic device 200 is closed (i.e., the first housing 201 and the second housing are arranged in the up-down direction (D2) again), and the supporting member 4 is urged to pivot back to the initial position (i.e., the supporting end portion 42 is urged to move upwardly relative to the base 1). The manner in which the supporting member 4 is urged to pivot is deducible, and so the details thereof are omitted. When the electronic device 200 is closed (i.e., when the rotation member 2 is in the first position) and not in use, because the foot pad 300 that is mounted to the supporting end portion 42 only protrudes downwardly from the bottom portion of the first housing 201 slightly, the electronic device 200 is easy to be stored.

It is noted that, in this embodiment, the rotating shaft device 100 is configured to be a single-axis rotating shaft device. However, in a modification of the embodiment (not shown), the rotating shaft device 100 may be configured to be a dual-axis rotating shaft device. Specifically, in the modification of the embodiment, the rotating shaft device 100 further includes another rotation member (not shown) that is connected to the rotation member 2, and the second housing is mounted to the another rotation member.

In summary, by virtue of the supporting member 4 being urged to pivot by movement of each of the slide member 3 and the linkage unit 5 and by the rotation of the rotation member 2, when the rotation member 2 is rotated from the first position to the second position, the supporting member 4 is urged to pivot from the initial position to the supporting position (i.e., the supporting end portion 42 is urged to move downwardly relative to the base 1). As such, when the rotating shaft device 100 is used in the electronic device 200, which may be a notebook computer, a rear side of the electronic device 200 (i.e., a rear side of the notebook computer) may be lifted conveniently by the foot pad 300 that is mounted to the supporting member 4, or, if the foot pad 300 is omitted, by the supporting member 4 when the user uses the notebook computer. Consequently, the space for dissipating the heat that is generated during the operation of the electronic device 200 (i.e., the notebook computer) is increased, and the electronic device 200 offers greater comfort to the user when the user uses the keyboard of the first housing 201 of the electronic device 200.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotating shaft device comprising:
a base;
a rotation member disposed on the base and rotatable relative to the base about a rotation axis between a first position and a second position, the rotation axis extending in a left-right direction, the rotation member having a rotation guiding structure that at least partially surrounds the rotation axis;
a slide member disposed on the base and slidable relative to the base in the left-right direction, the slide member having a slide engaging structure that is coupled to the rotation guiding structure and that is slidable along the rotation guiding structure, and a slide guiding structure that extends in an up-down direction;
a supporting member pivotably mounted to the base and pivotable relative to the base between an initial position and a supporting position; and
a linkage unit including a first link that is pivotally connected to the base, a second link that is located at one side of the first link, and that is pivotably connected to the first link and the supporting member, and a linkage engaging structure that is disposed at a junction of the first link and the second link, that is coupled to the slide guiding structure of the slide member, and that is slidable along the slide guiding structure, a portion of the second link peeking out from under the first link, the linkage unit being convertible between a folded state and an expanded state, when the rotation member is in the first position, the linkage unit being in the folded state and the supporting member being in the initial position, when the rotation member is rotated to the second position, the slide member being urged by rotation of the rotation member to slide in the left-right direction and to convert the linkage unit into the expanded state, and the supporting member being urged by the second link of the linkage unit to pivot to the supporting position.

2. The rotating shaft device as claimed in claim 1, wherein the rotation guiding structure of the rotation member is configured to be a groove, and the slide engaging structure of the slide member is configured to be a protrusion.

3. The rotating shaft device as claimed in claim 2, wherein the rotation member further has a convex curved surface, the rotation guiding structure being formed in the convex curved surface, the slide member further having a concave curved surface that is coupled to the convex curved surface, the slide engaging structure being formed on the concave curved surface.

4. The rotating shaft device as claimed in claim 1, wherein the slide guiding structure of the slide member is configured to be a groove, and the linkage engaging structure of the linkage unit is configured to be a protrusion.

5. The rotating shaft device as claimed in claim 4, wherein the linkage unit includes an interconnecting member that extends through the junction of the first link and the second link in a front-rear direction, that interconnects the first link and the second link, and that includes the linkage engaging structure.

6. The rotating shaft device as claimed in claim 1, wherein the base includes a guide rod that extends in the left-right direction, and the slide member includes a slide sleeve that is sleeved on the guide rod and that is slidable relative to the guide rod in the left-right direction.

7. The rotating shaft device as claimed in claim 1, wherein the supporting member is pivotable relative to the base about a pivot axis between the initial position and the supporting position, the pivot axis extending in a front-rear direction.

8. The rotating shaft device as claimed in claim 1, wherein the supporting member is configured to be rod-shaped, and has a pivot end portion that is pivotably mounted to the base, and a supporting end portion that is pivotably connected to the second link of the linkage unit.

\* \* \* \* \*